United States Patent [19]

Staendeke

[11] Patent Number: 4,772,642
[45] Date of Patent: Sep. 20, 1988

[54] SELF-EXTINGUISHING POLYMERIC COMPOSITIONS

[75] Inventor: Horst Staendeke, Lohmar, Fed. Rep. of Germany

[73] Assignee: Hoechst Aktiengesellschaft, Frankfurt am Main, Fed. Rep. of Germany

[21] Appl. No.: 39,791

[22] Filed: Apr. 16, 1987

Related U.S. Application Data

[63] Continuation of Ser. No. 830,663, Feb. 18, 1986, abandoned.

[30] Foreign Application Priority Data

Mar. 4, 1985 [DE] Fed. Rep. of Germany ....... 3507562

[51] Int. Cl.⁴ .............................. C08K 9/00; C08K 3/32
[52] U.S. Cl. ...................................... 523/205; 523/208; 524/416; 524/502; 524/507; 524/508; 524/509; 524/512
[58] Field of Search ................ 523/205, 208; 524/416, 524/508, 509, 512, 502, 507

[56] References Cited

U.S. PATENT DOCUMENTS 4,198,493  4/1980  Marciandi ........................... 524/416
4,347,334  8/1982  Staendeke et al. .................. 524/416
4,467,056  8/1984  Staendeke et al. .................. 524/416
4,514,328  4/1985  Staendeke et al. .................. 524/416

*Primary Examiner*—John Kight
*Assistant Examiner*—Kriellion Morgan

[57] ABSTRACT

Self-extinguishing polymeric composition based on a polyolefin, especially polypropylene, of improved thermal stability containing an intumescent fire-retardant system comprised of a phosphorus constituent and a carbonaceous nitrogen constituent. The composition contains more particularly, as the phosphorus constituent, a product consisting substantially of (a) 75–99.5 wgt % pulverulent free flowing ammonium polyphosphate of the following general formula

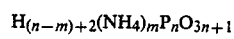

$$H_{(n-m)+2}(NH_4)_m P_n O_{3n+1}$$

in which n stands for an integer having an average value of from about 20 to 800 and the ratio of m/n is about 1, and (b) about 0.5–25 wgt % of a water-insoluble, optionally cured artificial resin encapsulating the individual ammonium polyphosphate particles.

5 Claims, No Drawings

SELF-EXTINGUISHING POLYMERIC COMPOSITIONS

This case is a continuation of my copending application, Ser. No. 830,663, filed Feb. 18, 1986, now abandoned.

This present invention relates to self-extinguishing polymeric compositions based on a polyolefin, especially on polypropylene, of improved thermal stability containing an intumescent flame-retardant system comprised of a phosphorus constituent and a carbonaceous nitrogen constituent.

It is generally accepted that polymeric compositions having self-extinguishing properties can be obtained by incorporating an intumescent system into a polymer matrix (cf. DE-OS No. 27 23 877, DE-OS No. 28 00 891, DE-OS No. 28 39 710, EP-PS No. 00 23 353, EP-OS No. 00 73 488).

In order to improve the thermal stability of such flame-retardant plastics material, it has already been suggested that either the nitrogen-containing constituent should be modified (EP-PS No. 00 14 463) or the ammonium polyphosphate should be partially replaced by melamine phosphate (EP-PS No. 01 25 652).

We have now unexpectedly found that the thermal stability of a flame-retardant polyolefin, especially of a flame-retardant polypropylene composition can be distinctly improved by using, as the phosphorus component, a product consisting substantially of (a) 75–99.5 wgt % pulverulent free flowing ammonium polyphosphate of the following general formula

$$H_{(n-m)+2}(NH_4)_m P_n O_{3n+1}$$

in which n stands for an integer having an average value of from about 20 to 800 and the ratio of m/n is about 1, and (b) about 0.5–25 wgt % of a water-insoluble, optionally cured artificial resin encapsulating the individual ammonium polyphosphate particles in a total concentration of from about 5 to 30 wgt %, based on the total composition.

The term "total composition" as used herein denotes the mixture of polyolefin, especially polypropylene, phosphorus constituent and carbonaceous nitrogen constituent, the carbon being chemically bonded in the nitrogen constituent.

The ammonium polyphosphate or product of ammonium polyphosphate and artificial resin should preferably consist substantially of particles with a size of from 0.01 to 0.05 mm. It is also generally preferable for the ammonium polyphosphate to have a degree of condensation n averaging 450–800 (determined by the terminal group titration method described by van Wazer et al., Anal. Chem. 26, 1755 (1954)).

The water-insoluble artificial resin encapsulating the phosphorus constituent is either a cured polycondensation product of melamine and formaldehyde or a cured epoxide resin or a cured polycondensation product of an aromatic hydroxy compound and formaldehyde or a polycondensation product of a polyol and a polyisocyanate (polyurethane) or a reaction product of a polyisocyanate. The polyisocyanate reaction product can more particularly be made by reacting a polyisocyanate with water resulting in the formation of a polyurea, or reacting a polyisocyanate in contact with a trimerization catalyst resulting in the formation of a polyisocyanurate or reacting a polyisocyanate in contact with a carbodiimidization catalyst resulting in the formation of a polycarbodiimide.

A water-insoluble organic polycondensate (with 28% nitrogen) (Intumescent Flame Retardant SPINFLAM MF 80, a product of MONTEDISON S.p.A., Milano; Italy, which is a water-insoluble ethylene-urea polycondensate containing 28% nitrogen) is used as a nitrogen-containing synergist for the intumescent system.

EXAMPLE 1

(Prior Art)

4300 g: HOSTALEN (this is a registered Trade Mark of HOECHST AKTIENGESELLSCHAFT, Frankfurt/M. Federal Republic of Germany) PPT 0170 P—melting index MFI 230/5: 25 g/10 min—this is pulverulent polypropylene.

1100 g: EXOLIT (this is a registered Trade Mark of HOECHST AKTIENGESELLSCHAFT, Frankfurt) 422 this is fine particulate, difficultly water-soluble ammonium polyphosphate of the formula $(NH_4PO_3)_n$, where n is about 700; more than 99% of the ammonium polyphosphate particles have a size of less than 45 μm.

500 g: SPINFLAM MF 80 (a product of MONTEDISON S.p.A. Milano)

this is a water-insoluble ethylene-urea polycondensate containing 28% nitrogen and consisting of particles with a mean size of 54 μm.

100 g: titanium dioxide.

10 g: calcium stearate.

5 g: IONOL (this is a registered Trade Mark of RASCHIG GmbH, Ludwigshafen, Federal Republic of Germany)

this is 2,6-bis(1,1-dimethylethyl)-4-methylphenol.

10 g: HOSTANOX (this is a registered Trade Mark of HOECHST AKTIENGESELLSCHAFT, Frankfurt) 03 this is an antioxidant based on polynuclear phenols.

10 g: HOSTANOX (this is a registered Trade Mark of HOECHST AKTIENGESELLSCHAFT, Frankfurt) SE 10 this is an antioxidant based on dialkyl sulfides—were initially mixed in a SPANGEBERG intense mixer (20 liter capacity), then extruded in a WEBER small extruder (20 mm screw diameter) and granulated using a DREHER laboratory granulator.

Next, the granulated material was introduced into a steam-heated BECKER-VAN HÜLLEN press and made at a temperature of 195° C. and under a pressure of 2–3 bars (5–10 minutes) or 300 bars (2 minutes) into test plates 2 mm thick.

The incendiary behaviour was tested in accordance with the directions of Underwriters Laboratories "Test for Flammability of Plastic Material"—UL 94, dated as of May 2, 1975, on specimens 127 mm long, 12.7 mm wide and 2 mm thick.

The oxygen index was determined in a modified apparatus substantially in accordance with ASTM-D 2863-74.

The results of the burn-up tests are indicated in Table 1 hereinafter.

Ageing tests were made in a drying cabinet with recycle of air at 140° C. for evaluating the thermal stability.

The changes in tint were determined visually by comparison with a color chart.

The ageing test results are indicated in Table 2 hereinafter.

EXAMPLE 2

(Prior Art)

The procedure was as described in Example 1 but the 1100 g EXOLIT 422 ® were replaced by a mixture of
610 g: EXOLIT 422 ® and
490 g: melamine phosphate (a product of SKW Trostberg Aktiengesellschaft, Trostberg, Federal Republic of Germany).

The incendiary and ageing test results are indicated in Tables 1 and 2, respectively.

EXAMPLE 3

(Invention)

The procedure was as in Example 1 but the 1100 g EXOLIT 422 ® were replaced by
1100 g: EXOLIT 462 ®
this is ammonium polyphosphate microencapsulated in a melamine/formaldehyde resin.

The incendiary and ageing test results are indicated in Tables 1 and 2, respectively.

EXAMPLE 4

(Invention)

The procedure was as in Example 1, but the 1100 g EXOLIT 422 ® were replaced by
1100 g EXOLIT 455 ®
this is ammonium polyphosphate microencapsulated in epoxide resins.

The incendiary and ageing test results are indicated in Tables 1 and 2, respectively.

TABLE 1

Incendiary test according to Ul 94
Oxygen index (ASTM 2863-74)

| Testing method | Example 1 | Example 2 | Example 3 | Example 4 |
|---|---|---|---|---|
| Burning class reached in Ul 94-vertical test | V-0 | V-0 | V-0 | V-0 |
| Oxygen index (% $O_2$) | 34 | 33 | 36 | 34 |

TABLE 2

Ageing test at 140° C. (with recycle of air)

| Ageing period (days) | Index numbers | | | |
|---|---|---|---|---|
| | Example 1 | Example 2 | Example 3 | Example 4 |
| 1 | 1 | 1 | 0 | 0 |
| 2 | 3 | 2 | 1 | 0 |
| 7 | 6 | 4 | 3 | 1 |
| 14 | 8 | 6 | 4 | 2 |
| 21 | 9 | 7 | 5 | 3 |
| 28 | 10 | 8 | 6 | 4 |

Color chart

| Index number | Tints |
|---|---|
| 0 | colorless |

TABLE 2-continued

Ageing test at 140° C. (with recycle of air)

| 1-2 | beige |
| 3-4 | beige-brown |
| 5-6 | light brown |
| 7-8 | brown |
| 9-10 | black |

We claim:

1. A thermostable and self-extinguishing polyolefin containing an intumescent fire-retardant system comprised of a phosphorus constituent and a polymeric ethylene-urea condensation product as a nitrogen-containing synergist for the intumescent fire-retardant system, the system containing, as the phosphorus constituent, a product consisting substantially of
    (a) 75–99.5 wgt % pulverulent free flowing ammonium polyphosphate of the following general formula $$H_{(n-m)+2}(NH_4)_m P_n O_{3n+1}$$

in which n stands for an integer having an average value of from about 20 to 800 and the ratio of m/n is about 1, and
    (b) about 0.5–25 wgt % of a water-insoluble resin encapsulating the individual ammonium polyphosphate particles, wherein the water-insoluble resin is a substance, selected from the group consisting of
        (b1) a cured polycondensation product of melamine and formaldehyde,
        (b2) a cured epoxide resin,
        (b3) a cured polycondensation product of an aromatic hydroxy compound and formaldehyde,
        (b4) a polycondensation product of a polyol and a polyisocyanate,
        (b5) a reaction product of a polyisocyanate produced by reacting a
            (b5, 1) polyisocyanate with water resulting in the formation of a polyurea,
            (b5, 2) polyisocyanate in contact with a trimerisation catalyst resulting in the formation of a polyisocyanurate,
            (b5, 3) polyisocyanate in contact with a carbodiimidization catalyst resulting in the formation of a polycarbodiimide, this phosphorus constituent is present in a total concentration of from about 5 to 30 wgt %, based on the total polyolefin composition to provide a polyolefin of improved thermal stability.

2. A self-extinguishing polyolefin as claimed in claim 1, wherein the water-insoluble resin is a cured artificial resin.

3. A self-extinguishing polyolefin as claimed in claim 1, wherein the ammonium polyphosphate or product of ammonium polyphosphate and artificial resin substantially consists of particles having a mean size of from 0.01 to 0.05 mm.

4. A self-extinguishing polyolefin as claimed in claim 1, wherein the ammonium polyphosphate has a degree of condensation n averaging 450 to 800.

5. A self-extinguishing polyolefin as claimed in claim 1, wherein the polyolefin is polypropylene.

* * * * *